(12) United States Patent
Guarin Aristizabal et al.

(10) Patent No.: US 11,668,793 B2
(45) Date of Patent: Jun. 6, 2023

(54) RADAR SYSTEM

(71) Applicant: NXP USA, INC., Austin, TX (US)

(72) Inventors: Gustavo Adolfo Guarin Aristizabal, Munich (DE); Arnaud Sion, Munich (DE); Ryan Haoyun Wu, San Jose, CA (US)

(73) Assignee: NXP USA, INC., Austin, TX (US)

( * ) Notice: Subject to any disclaimer, the term of this patent is extended or adjusted under 35 U.S.C. 154(b) by 195 days.

(21) Appl. No.: 17/114,601

(22) Filed: Dec. 8, 2020

(65) Prior Publication Data
US 2021/0223361 A1    Jul. 22, 2021

(30) Foreign Application Priority Data
Jan. 16, 2020 (EP) ...................................... 20152111

(51) Int. Cl.
*G01S 7/40* (2006.01)
*G01S 7/35* (2006.01)
*G01S 13/931* (2020.01)

(52) U.S. Cl.
CPC ................ *G01S 7/40* (2013.01); *G01S 7/352* (2013.01); *G01S 7/4017* (2013.01);
(Continued)

(58) Field of Classification Search
CPC .......... G01S 7/40; G01S 7/352; G01S 7/4017; G01S 7/4021; G01S 13/931; G01S 2013/93271; G01S 7/356
See application file for complete search history.

(56) References Cited

U.S. PATENT DOCUMENTS

| 8,212,715 B2 | 7/2012 | Himmelstoss et al. |
| 9,866,222 B2 | 1/2018 | Trotta et al. |

(Continued)

OTHER PUBLICATIONS

Kumar, A., "AWR1243 Cascade", Application Report, Texas Instruments, SWRA574A, Oct. 2017.
(Continued)

*Primary Examiner* — Peter M Bythrow
*Assistant Examiner* — Nazra Nur Waheed (57) ABSTRACT

The disclosure relates to a radar system comprising multiple synchronized transceivers. Example embodiments include a radar system (200, 300) comprising: a plurality of radar transceiver units (202*a-c*), each configured to operate according to a low frequency clock signal (204), and configured to generate an intermediate frequency signal (407) and a modulated high frequency signal (419) for transmitting and receiving radar signals; and a microcontroller unit (201) configured to provide control signals to each transceiver unit (202*a-c*) to synchronize operation thereof, wherein each radar transceiver unit (202*a-c*) is configured to provide received radar data ($RX_{1-N}$) and a monitoring signal (203*a-c*) to the microcontroller unit (201), the monitoring signal (203*a-c*) derived by frequency dividing and combining the modulated high frequency signal and intermediate frequency signal, and wherein the microcontroller unit (201) is configured to derive and compensate for phase and frequency differences between the received radar data ($RX_{1-N}$) from each transceiver (202*a-c*) based on the monitoring signals (203*a-c*) provided by each transceiver unit (202*a-c*).

20 Claims, 8 Drawing Sheets

(52) U.S. Cl.
CPC .......... *G01S 7/4021* (2013.01); *G01S 13/931* (2013.01); *G01S 7/356* (2021.05); *G01S 2013/93271* (2020.01)

(56) References Cited

U.S. PATENT DOCUMENTS

| | | | |
|---|---|---|---|
| 2016/0018511 A1* | 1/2016 | Nayyar | G01S 7/03 |
| | | | 342/27 |
| 2016/0245898 A1 | 8/2016 | Li et al. | |
| 2018/0024233 A1* | 1/2018 | Searcy | G01S 7/032 |
| | | | 342/125 |
| 2018/0172801 A1* | 6/2018 | Schrattenecker | G01S 7/352 |
| 2019/0128998 A1* | 5/2019 | Josefsberg | G01S 13/867 |
| 2019/0129026 A1* | 5/2019 | Sumi | G01S 7/52033 |
| 2020/0142055 A1* | 5/2020 | Fox | G01S 13/90 |
| 2020/0300965 A1 | 9/2020 | Wu et al. | |
| 2020/0300995 A1 | 9/2020 | Wu | |

OTHER PUBLICATIONS

Starzer, F., "A Novel 77-GHz Radar Frontend with 19-GHz Signal Distribution on RF-PCB Substrate", 2010 Topical Meeting on Silicon Monolithic Integrated Circuits in RF Systems (SiRF), Jan. 11-13, 2010.

* cited by examiner

RADAR SYSTEM

CROSS-REFERENCE TO RELATED APPLICATIONS

This application claims the priority under 35 U.S.C. § 119 of European Patent application no. 20152111.9, filed on 16 Jan. 2020, the contents of which are incorporated by reference herein.

FIELD

The disclosure relates to a radar system comprising multiple synchronized transceivers.

BACKGROUND

In automotive radar applications, if more than four transmitting and receiving signals are required, multiple integrated circuits (ICs, or chips) generally need to be cascaded and synchronized. To achieve synchronization, digital clocks of all the ICs must have the same frequency and phase. This is particularly important for the clocks driving the ADCs (analog to digital converters) at the receiver. For this purpose, two signals may be used, one in the range of between 40 MHz to 500 MHz to synchronize the PLL (phase locked loop) clock and another digital signal to synchronize the start of modulation and ADC sampling. The high frequency signals must also be correlated and coherent in phase. For this reason, one master LO (local oscillator) signal may be distributed to all the chips to drive a mixer at the transmitter (TX) and at the receiver (RX). This signal may be in the range of between 20 GHz to 40 GHZ. This high frequency signal must be routed from the master signal generator to all the slaves with the same transmission path length in order to maintain phase alignment.

When the transceivers are co-located in the same PCB (printed circuit board), the high frequency LO signal has to be routed in the PCB, which adds high losses to the LO signal. This may be compensated by increasing the output power at the LO transmitter in the master transceiver, which increases power consumption and power dissipation, or by limiting the number of transceivers that can be cascaded. In applications where the transceivers are not co-located, such as in a distributed co-operative system, the high frequency LO signal may be distributed to the slave transceivers through coaxial cables, waveguides or a wireless link. These alternatives, however, increase the complexity and cost of the radar system.

SUMMARY

In accordance with the present disclosure there is provided a radar system comprising:

a plurality of radar transceiver units, each configured to operate according to a low frequency clock signal, and configured to generate an intermediate frequency signal and a modulated high frequency signal for transmitting and receiving radar signals; and a microcontroller unit configured to provide control signals to each transceiver unit to synchronize operation thereof, wherein each radar transceiver unit is configured to provide received radar data and a monitoring signal to the microcontroller unit, the monitoring signal derived by frequency dividing and combining the modulated high frequency signal and intermediate frequency signal, and wherein the microcontroller unit is configured to derive and compensate for phase and frequency differences between the received radar data from each transceiver unit based on the monitoring signals provided by each transceiver unit.

Using a lower frequency monitoring signal, which may for example be in the range of 40 MHz to 240 MHz, allows phase difference and relative frequency differences to be calculated by the microcontroller unit, which can be used to compensate for phase and frequency errors during signal processing. The monitoring signals, being at a lower frequency than the radar frequency range, can be more easily, distributed without the need for specialised waveguides or substrates, allowing greater flexibility in design of a radar system. This enables both co-located and non-co-located larger cascade systems to be built.

The low frequency clock signal may be within a range between 40 MHz and 500 MHz, for example between around 40 MHz and 60 MHz.

The modulated high frequency signal may be within a range of between 76 GHz and 81 GHz.

The radar system may comprise four or more radar transceiver units.

Each of the plurality of radar transceiver units may comprise a voltage controlled oscillator, VCO, for generating the modulated high frequency signal in combination with the intermediate frequency signal.

The monitoring signal may be a digital signal comprising phase and frequency information of the modulated high frequency signal.

In some examples each of the plurality of radar transceiver units may comprise a clock signal generator for providing the low frequency clock signal. In alternative examples a clock signal generator may be configured to provide a common low frequency clock signal to each of the plurality of radar transceiver units.

Each of the plurality of radar transceiver units may comprise a VCO monitoring module comprising a first frequency divider configured to receive the modulated high frequency signal, a second frequency divider configured to receive the intermediate frequency signal, a mixer configured to mix outputs from the first and second frequency dividers and an analog to digital converter, ADC, configured to provide a digital monitoring signal from an output of the mixer.

In some examples the microcontroller unit may be configured to:

select one of the monitoring signals as a reference signal;
multiply the reference signal with each of the other monitoring signals to obtain a plurality of mixed signals; and
calculate a frequency and phase difference between each of the other monitoring signals and the reference signal from a Fourier transform of each of the plurality of mixed signals.

In alternative examples the microcontroller unit may be configured to:

calculate a Fourier transform of each of the monitoring signals;
select one of the monitoring signals as a reference signal;
determine a maximum peak in magnitude of each transformed monitoring signal;
calculate frequency and phase differences between the reference signal and each of the other monitoring signals.

In further alternative examples the microcontroller unit may be configured to:

apply a Hilbert transform to each of the monitoring signals;

calculate a phase from each transformed signal and a frequency from a derivative of the phase;

select one of the monitoring signals as a reference signal;

subtracting the calculated phase and frequency of the reference signal from the other monitoring signals, The plurality of radar transceiver units may be co-located on a common substrate, or may be located on separate substrates.

An automotive radar system may comprise a radar system as defined and described herein.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

DETAILED DESCRIPTION OF EMBODIMENTS

Figure 1:
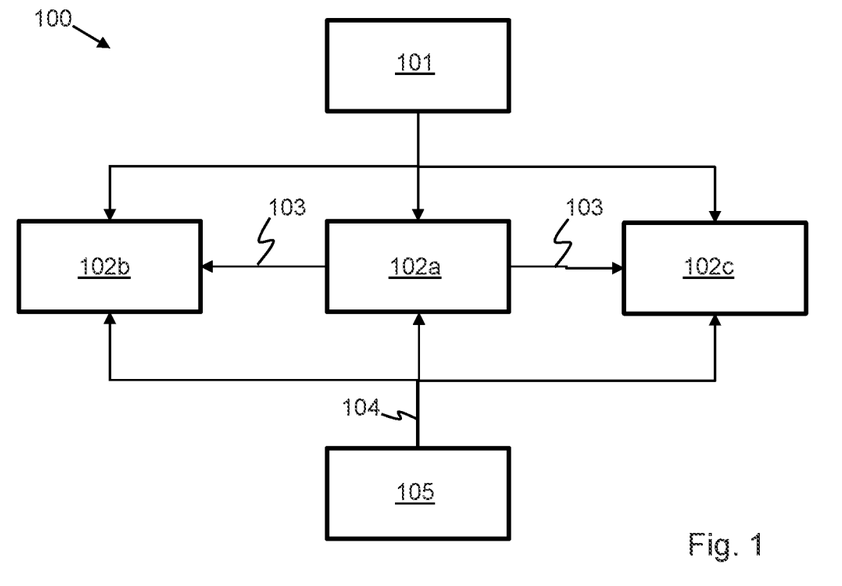
FIG. 1 is a schematic diagram of an example conventional automotive radar system.

FIG. 1 illustrates an example conventional automotive radar system 100, comprising a radar microcontroller unit (MCU) 101 and three transceiver units 102a-c. Transceiver unit 102a is a master unit, and provides a VCO signal 103 to each of the two slave transceiver units 102b, 102c. A reference clock signal 104 is provided to each of the transceiver units 102a-c by a clock signal generator 105, which may for example operate at 40 to 60 MHz. During operation, a pulse signal is provided by the MCU 101 to each transceiver unit 102a-c to indicate the start of modulation, and the clock signal 104 is used to synchronize the digital clocks of the transceiver units 102a-c. The VCO signal 103 provided by the master transceiver unit 102a ensures synchronization of frequency and time of the high frequency signal, with the slave transceiver units 102b, 102c using only mixers and amplifiers at the transmitter and receiver paths.

If the VCOs of the transceivers 102a-c are instead run independently and with no synchronization, frequency and phase differences will tend to occur between the transceiver units 102a-c due to process, temperature and voltage variations across the transceiver units 102a-c, making the radar system 100 inoperable.

Figure 2:
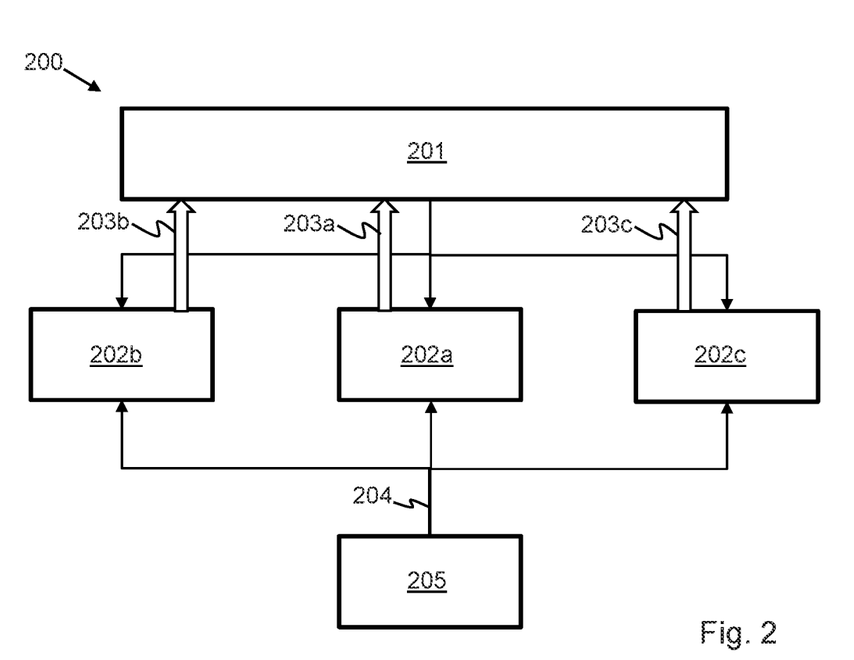
FIG. 2 is a schematic diagram of an example automotive radar system with VCO monitoring signals.

FIG. 2 illustrates an example radar system 200 in accordance with the present disclosure. As with the system 100 of FIG. 1, the system comprises an MCU 201, a clock signal generator 205 and a plurality of transceiver units 202a-c, the clock signal generator 205 providing a reference clock signal 204 to each of the transceiver units 202a-c. As with the system 100 of FIG. 1, three transceiver units 202a-c are shown, but this number is for example only. In practice the number of transceiver units may be greater than this or as few as two, although the principles described herein have advantages for a system having a greater number of units, for example four or more.

Unlike the system 100 of FIG. 1, none of the transceiver units 202a-c operate as a master unit providing a common VCO signal to the other slave units. Instead, VCO monitor signals 203a-c are provided by the respective transceiver units 202a-c to the MCU 201, each VCO monitor signal 203a-c being derived from a VCO signal generated internally by each transceiver unit 202a-c. Each VCO monitoring signal 203a-c is a frequency scaled version of the internal VCO signal in each transceiver unit 202a-c, the frequency being scaled by a linear factor. This enables the VCO monitoring signals 203a-c to be transported via simple low cost connections or to be digitized without loss of phase and frequency information. The VCO monitoring signals 203a-c are compared by the MCU 201 and the relative phase and frequency differences of the VCO signals within each transceiver unit 202a-c calculated. Knowledge of the relative phase and frequency differences enables compensation to be made in the digital domain by applying simple linear transformations. Such compensation may be made by convolution in the frequency domain, involving dividing the original signal over all frequencies by the error signal at a single frequency.

The reference clock signal 204 is a low frequency signal (e.g. 40 to 60 MHz) that is used as a reference by each transceiver unit 202a-c to generate high frequency signals for transmission and reception of radar signals, which may be in the range of 76-81 GHz. The reference clock signal 204 may be generated by a single clock signal generator 205 as in the example of FIG. 2, thereby ensuring that there is no frequency drift between the transceivers 202a-c, or may alternatively be generated separately for each transceiver unit 202a-c, provided the frequency drift can be designed to be low. Small frequency drifts between the clock signals, for example up to around 10% of the sampling frequency of the ADC at the receiver, can be compensated for. To compensate for such frequency differences, the VCO monitoring signal 203a-c may be used to calculate any differences, which can be compensated for by shifting the signals in the frequency domain. In the alternative example system 300 shown in FIG. 3, a clock signal 204a-c is provided to each transceiver 202a-c by a respective clock signal generator 205a-c. The other components of the system 300 are the same as in the system 200 of FIG. 2.

Figure 3:
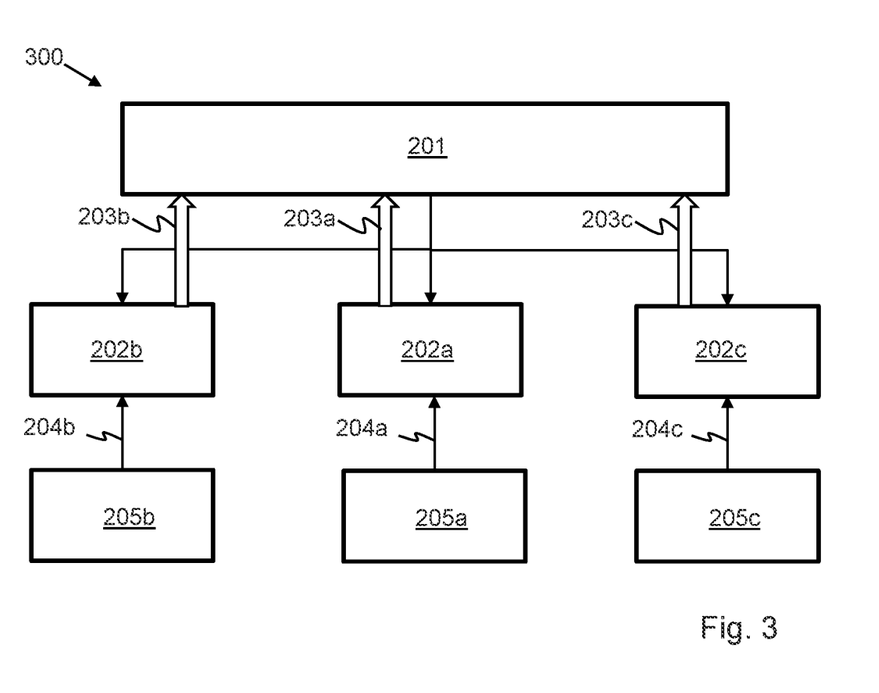
FIG. 3 is a schematic diagram of an alternative version of the system of FIG. 2.

As with the system 100 of FIG. 1, operation of the system 200, 300 begins with a trigger signal, for example in the form of a pulse, being sent from the MCU 201 to each transceiver unit 202a-c to synchronize the start of modulation.

Figure 4:
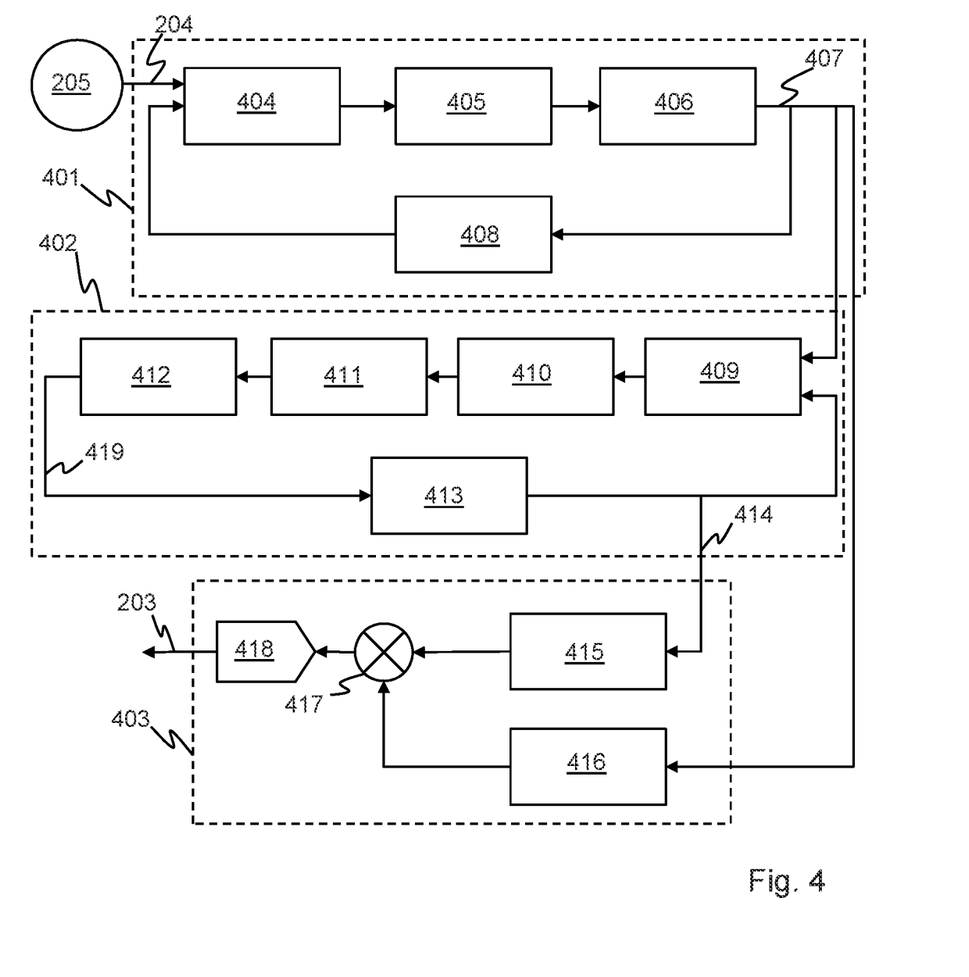
FIG. 4 is a schematic diagram of a part of an example transceiver.

FIG. 4 illustrates first and second phase-locked loops 401, 402 and a VCO monitoring module 403, which are provided as part of an example transceiver unit. The first PLL 401 generates an intermediate frequency signal 407 and the second PLL generates a high frequency modulated signal 419. The frequency modulated signal 419 and the intermediate frequency signal are divided in frequency and are combined and digitized to provide a VCO monitoring signal 203.

In the first PLL 401, a reference clock signal 204 is provided by a clock signal generator 205 to a first phase-frequency detector (PFD) 404, which provides an output signal to a first low-pass filter 405. The low-pass filtered signal is then provided to a first VCO 406, which generates an intermediate frequency (IF) signal 407. This IF signal 407 is fed back to the PFD 404 via a first frequency divider 408.

In the second PLL 402, the IF signal 407 is provided to a second PFD 409, which provides an output signal to a charge pump 410, which provides a signal to a second first low-pass filter 411. The low-pass filtered signal is then provided to a second VCO 412, the output of which is the VCO high frequency signal 419, within a range between 76 and 81 GHz. The high frequency signal 419 is fed back to the second PFD 409 via a second frequency divider 413.

The outputs 407, 419 from the first and second PLLs 401, 402 are provided to the VCO monitoring module 403. The VCO monitoring module 403 comprises third and fourth frequency dividers 415, 416, to which the respective outputs 407, 414 from the first and second PLLs 401, 402 are provided. The outputs from the third and fourth frequency dividers 415, 416 are provided to a mixer 417, which provides an output to an ADC 418. The output signal 203 from the ADC provides the VCO monitoring signal to the MCU 201 for the transceiver unit.

The frequency modulated signal 414 from the second PLL 402 may be downconverted to be digitized or may be digitized after the frequency divider. In the example shown in FIG. 4, the second and third frequency dividers 413, 415 divide in frequency the VCO signal 419, which is then down-converted by the mixer 417. In alternative arrangements, a digital counter may be used to count the number of zero crossings of the output signal 419 over a set period of time to calculate the frequency of the signal 419. To calculate the phase, the phase detector 409 at the PLL 402 may be used to calculate the relative phase of the signal 419 relative to the PLL reference signal.

Figure 5:
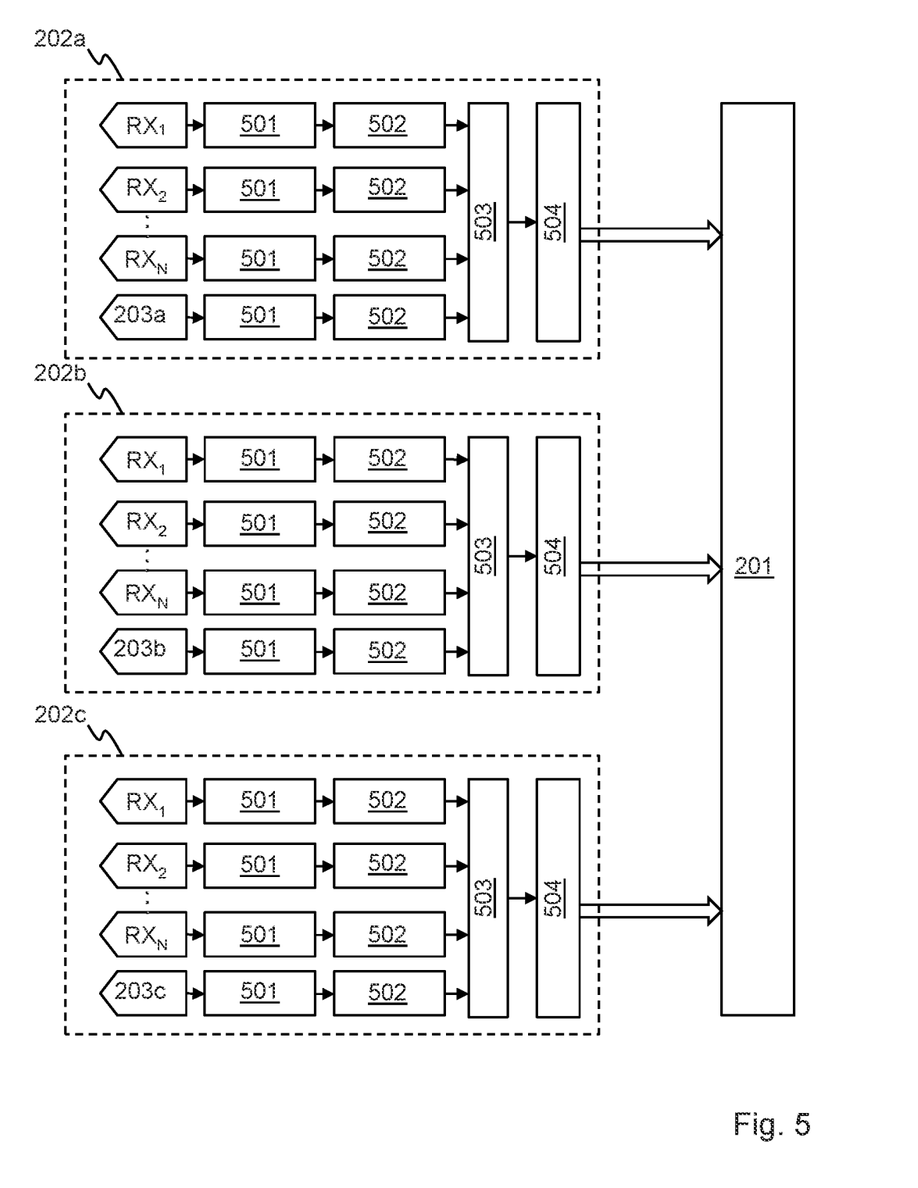
FIG. 5 is a schematic diagram of an example interface for communicating RX data and VCO monitoring data to a microcontroller unit.

To compensate for any frequency or phase difference between the VCO signals in each transceiver unit, the RX channel information and the VCO monitoring signals 203a-c have to be processed in a central processing unit such as the MCU 201. If the RX data and the VCO monitoring data are digitized, the information can be merged and transported by means of a high speed communication bus using a protocol such as a camera serial interface (e.g. MIPI-CSI2), Ethernet or another type of high speed bus. FIG. 5 illustrates an example of this using high speed communication via MIPI-CSI2. In each transceiver unit 202a-c, the VCO monitor signal 203a-c is provided in parallel with received radar data over N channels $RX_1$, $RX_2$ to $RX_N$ in sequence to a deserializer 501 and word aligner 502. Outputs from the word aligners 502 are provided to a lane aligner 503 and then to a parser 504, the output of which is provided to the MCU 201.

The MCU 201 calculates the frequency difference and phase difference between the VCOs in each transceiver unit 202a-c. Various methods may be used to do this, based on FFT (fast Fourier transform) processing.

Figure 6:
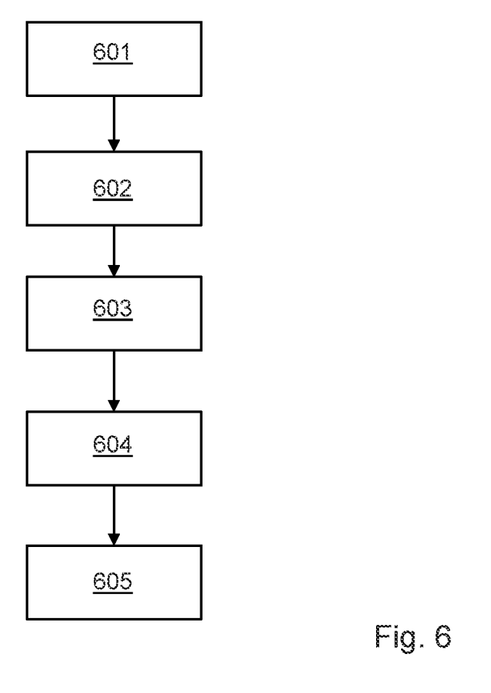
FIG. 6 is a schematic flow diagram illustrating a first method of calculating frequency and phase differences between VCOs.

In a first option, the method steps for which are illustrated in FIG. 6, one of the VCOs is selected as a reference (step 601) and the raw ADC samples of the reference VCO monitoring signal is multiplied with the VCO monitoring signal to be compared (step 602), simulating a mixer in the digital domain. The FFT of the resulting signal is calculated (step 603) and the frequency component with the highest energy close to the frequency zero determined (step 604). The frequency difference and phase information are then used to compensate the RX data (step 605).

Figure 7:
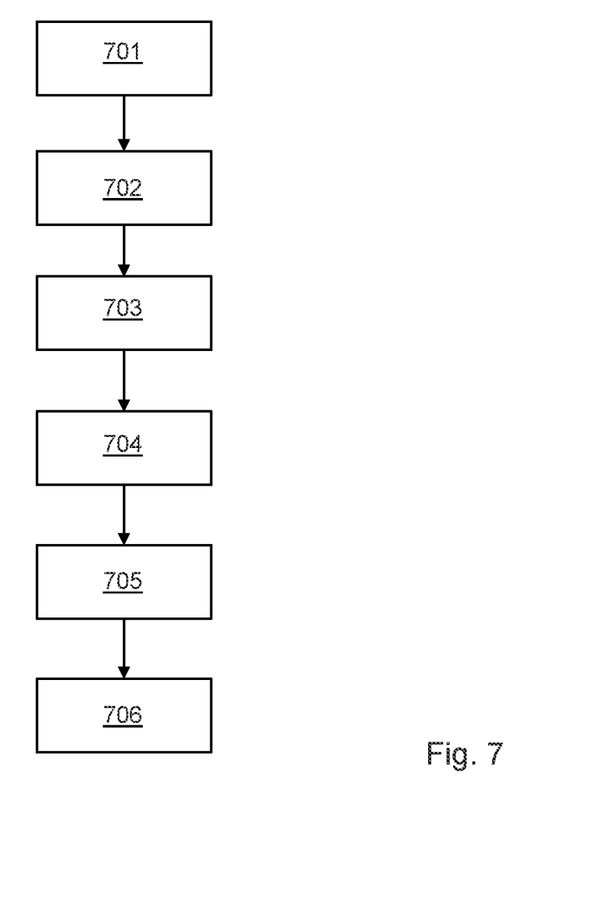
FIG. 7 is a schematic flow diagram illustrating a second method of calculating frequency and phase differences between VCOs.

In a second option, the method steps for which are illustrated in FIG. 7, an FFT is calculated of each of the different VCO monitoring signals (step 701). One of the signals is selected as a reference (step 702). A maximum peak is determined in the magnitude of each FFT (step 703). A frequency difference between reference signals and the other VCOs is calculated (step 704). For each of the amplitude peaks, the phase is determined and subtracted from the reference VCO signal (step 705). The frequency difference and phase difference are then compensate on all of the RX channels (step 706).

Figure 8:
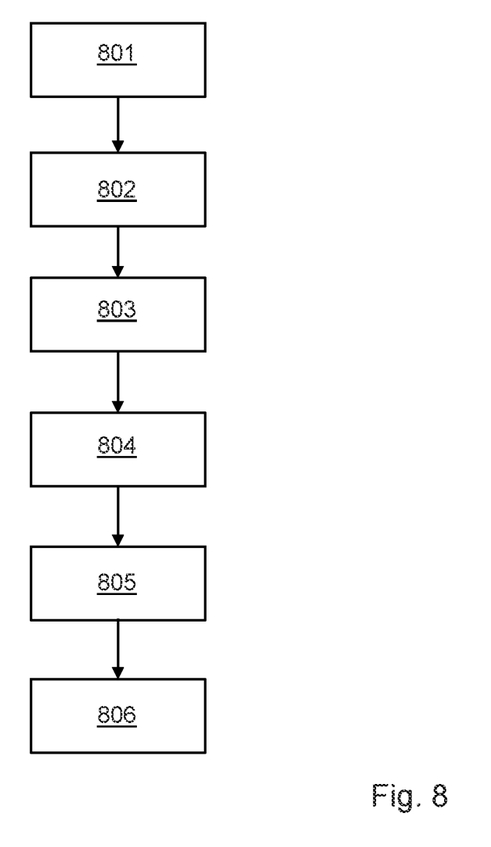
FIG. 8 is a schematic flow diagram illustrating a third method of calculating frequency and phase differences between VCOs.

In a third option, the method steps for which are illustrated in FIG. 8, the instant phase fix each of the VCO monitoring signals is calculated (step 801). This may be calculated by applying a Hilbert transform to the VCO monitoring signal. The phase is then calculated from the complex signal (step 802). From the derivative of the phase, the instant frequency can be calculated (step 803). One of the VCO monitoring signals is selected as a reference (step 804) and the instant frequency and phase is subtracted from the other VCO monitoring signals (step 805). The resulting values are then used to calibrate the RX channels (step 806).

The system and methods described herein may be applied to co-located radar systems, in which a plurality of transceivers is co-located on a common PCB. An advantage is that there is no need to distribute a high frequency signal from a master chip to each slave chip to synchronize each transceiver, which allows the transceivers to be positioned on the PCB in a more flexible way, reducing the distance between the transceiver and the antennae. A further advantage is not needing to use expensive high frequency PCB substrates if the antennae are integrated into each transceiver.

Figure 9:
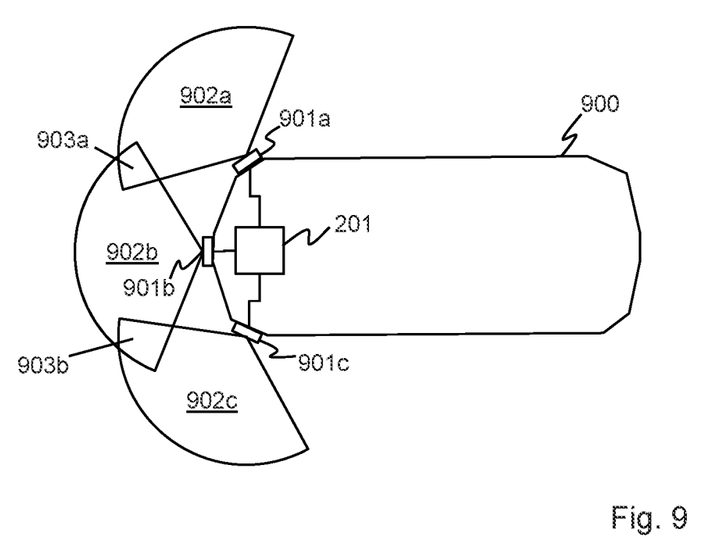
FIG. 9 is a schematic diagram of an automobile with a distributed co-operative radar system.

A system of the type described herein may also be implemented in a non-co-located or distributed cooperative radar system, for example in an automotive radar application. FIG. 9 illustrates a car 900 having multiple radar sensors 901a-c mounted at different locations around a front of the car 901, with a MCU 201 connected to each of the sensors 901a-c. The fields of view 902a-c of the sensors 901a-c have overlapping portions 903a, 903b. Using a system as described herein, the sensors 901a-c can be arranged as a co-operative net of sensors, resulting in an increased angular resolution as compared with a non-co-operative version.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

From reading the present disclosure, other variations and modifications will be apparent to the skilled person. Such variations and modifications may involve equivalent and other features which are already known in the art of radar systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A radar system comprising:
    a plurality of radar transceiver units, each configured to operate according to a low frequency clock signal, and configured to generate an intermediate frequency signal and a modulated high frequency signal for transmitting and receiving radar signals; and
    a microcontroller unit configured to provide control signals to each transceiver unit to synchronize operation thereof,
    wherein each radar transceiver unit is configured to provide received radar data and a monitoring signal to the microcontroller unit, the monitoring signal derived by frequency dividing and combining the modulated high frequency signal and intermediate frequency signal, and
    wherein the microcontroller unit is configured to derive and compensate for phase and frequency differences between the received radar data from each transceiver unit based on the monitoring signals provided by each transceiver unit.

2. The radar system of claim 1, wherein the low frequency clock signal is within a range between 40 MHz and 500 MHz.

3. The radar system of claim 1, wherein the modulated high frequency signal is within a range of between 76 GHz and 81 GHz.

4. The radar system of claim 1, comprising four or more radar transceiver units.

5. The radar system of claim 1, wherein each of the plurality of radar transceiver units comprises a voltage controlled oscillator, VCO, for generating the modulated high frequency signal in combination with the intermediate frequency signal.

6. The radar system of claim 1, wherein the monitoring signal is a digital signal comprising phase and frequency information of the modulated high frequency signal.

7. The radar system of claim 1, wherein each of the plurality of radar transceiver units comprises a clock signal generator for providing the low frequency clock signal.

8. The radar system of claim 1, comprising a clock signal generator configured to provide a common low frequency clock signal to each of the plurality of radar transceiver units.

9. The radar system of claim 1, wherein each of the plurality of radar transceiver units includes a first frequency divider configured to receive the modulated high frequency signal, a second frequency divider configured to receive the intermediate frequency signal, a mixer configured to mix outputs from the first and second frequency dividers and an analog-to-digital converter (ADC) configured to provide a digital monitoring signal from an output of the mixer.

10. The radar system of claim 1, wherein the microcontroller unit is configured to:
    select one of the monitoring signals as a reference signal;
    multiply the reference signal with each of the other monitoring signals to obtain a plurality of mixed signals; and
    calculate a frequency and phase difference between each of the other monitoring signals and the reference signal from a Fourier transform of each of the plurality of mixed signals.

11. The radar system of claim 1, wherein the microcontroller unit is configured to:
    calculate a Fourier transform of each of the monitoring signals;
    select one of the monitoring signals as a reference signal; and
    determine a maximum peak in magnitude of each transformed monitoring signal;
        calculate frequency and phase differences between the reference signal and each of the other monitoring signals.

12. The radar system of claim 1, wherein the microcontroller unit is configured to:
    apply a Hilbert transform to each of the monitoring signals;
    calculate a phase from each transformed signal and a frequency from a derivative of the phase;
    select one of the monitoring signals as a reference signal; and
    subtract the calculated phase and frequency of the reference signal from the other monitoring signals.

13. The radar system of claim 1, wherein the plurality of radar transceiver units are co-located on a common substrate.

14. The radar system of claim 1, wherein the plurality of radar transceiver units is located on separate substrates.

15. An automotive radar system comprising:
    a plurality of radar transceiver units, each mounted to a front of a car and configured to operate according to a low frequency clock signal, and configured to generate an intermediate frequency signal and a modulated high frequency signal for transmitting and receiving radar signals; and
    a microcontroller unit configured to provide control signals to each transceiver unit to synchronize operation thereof,
    wherein each radar transceiver unit is configured to provide received radar data and a monitoring signal to the microcontroller unit, the monitoring signal derived by frequency dividing and combining the modulated high frequency signal and intermediate frequency signal, and
    wherein the microcontroller unit is configured to derive and compensate for phase and frequency differences between the received radar data from each transceiver unit based on the monitoring signals provided by each transceiver unit.

16. The automotive radar system of claim 15, wherein each of the plurality of radar transceiver units comprises a voltage controlled oscillator, VCO, for generating the modulated high frequency signal in combination with the intermediate frequency signal.

17. The automotive radar system of claim 15, wherein the monitoring signal is a digital signal comprising phase and frequency information of the modulated high frequency signal.

18. The automotive radar system of claim 15, wherein each of the plurality of radar transceiver units comprises a clock signal generator for providing the low frequency clock signal.

19. The automotive radar system of claim 15, wherein each of the plurality of radar transceiver units comprises a first frequency divider configured to receive the modulated high frequency signal, a second frequency divider configured to receive the intermediate frequency signal, a mixer configured to mix outputs from the first and second frequency dividers and an analog-to-digital converter (ADC) configured to provide a digital monitoring signal from an output of the mixer.

20. The automotive radar system of claim 15, wherein the microcontroller unit is configured to:

select one of the monitoring signals as a reference signal;

multiply the reference signal with each of the other monitoring signals to obtain a plurality of mixed signals; and     calculate a frequency and phase difference between each of the other monitoring signals and the reference signal from a Fourier transform of each of the plurality of mixed signals.

\* \* \* \* \*